US009469786B2

(12) United States Patent
Kadrmas et al.

(10) Patent No.: US 9,469,786 B2
(45) Date of Patent: Oct. 18, 2016

(54) COMPOSITIONS COMPRISING ASPHALT AND ELECTRICALLY NEUTRAL COPOLYMER DISPERSIONS

(75) Inventors: Arlis Kadrmas, Wichita, KS (US); Armin Burghart, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/376,315

(22) PCT Filed: Feb. 3, 2012

(86) PCT No.: PCT/US2012/023715
§ 371 (c)(1),
(2), (4) Date: Dec. 22, 2014

(87) PCT Pub. No.: WO2013/115825
PCT Pub. Date: Aug. 8, 2013

(65) Prior Publication Data
US 2015/0110556 A1    Apr. 23, 2015

(51) Int. Cl.
| E01C 11/00 | (2006.01) |
| C09D 195/00 | (2006.01) |
| E01C 7/18 | (2006.01) |
| C08L 95/00 | (2006.01) |
| E01C 3/00 | (2006.01) |
| E01C 7/00 | (2006.01) |

(52) U.S. Cl.
CPC ......... *C09D 195/005* (2013.01); *C08L 95/005* (2013.01); *E01C 3/00* (2013.01); *E01C 7/00* (2013.01); *E01C 7/185* (2013.01); *E01C 11/00* (2013.01); *C08L 2555/28* (2013.01); *C08L 2555/80* (2013.01)

(58) Field of Classification Search
CPC ............. C09D 195/005; C08L 95/005; C08L 2555/28; C08L 2555/80; E01C 3/00; E01C 7/00; E01C 7/185; E01C 11/00
USPC .................................. 404/17, 31, 72, 75, 76
See application file for complete search history.

(56) References Cited

U.S. PATENT DOCUMENTS

| RE24,906 E | 12/1960 | Ulrich |
| 3,410,711 A | 11/1968 | Hoge |
| 3,622,531 A | 11/1971 | Buselli et al. |
| 3,736,285 A | 5/1973 | Miller |
| 4,337,185 A | 6/1982 | Wessling et al. |
| 4,440,816 A | 4/1984 | Uffner |
| 4,590,238 A | 5/1986 | Furomoto et al. |
| 4,596,834 A | 6/1986 | Widener et al. |
| 4,632,960 A | 12/1986 | Sato et al. |
| 5,202,375 A | 4/1993 | Biale |
| 5,424,122 A | 6/1995 | Crandall et al. |
| 5,874,498 A | 2/1999 | Daniels et al. |
| 5,895,173 A * | 4/1999 | O'Brien .................. E01C 19/21 404/108 |
| 5,905,114 A | 5/1999 | Baumstark et al. |
| 6,083,494 A | 7/2000 | Samain et al. |
| 6,258,890 B1 | 7/2001 | Schmidt-Thuemmes et al. |
| 6,444,748 B1 | 9/2002 | Angel et al. |
| 6,540,822 B2 | 4/2003 | Wates et al. |
| 6,706,787 B1 | 3/2004 | Burris et al. |
| 6,710,122 B2 | 3/2004 | Angel et al. |
| 6,762,269 B1 | 7/2004 | Maxim, Jr. et al. |
| 6,818,685 B1 | 11/2004 | Chapman |
| 8,217,111 B2 | 7/2012 | Takamura et al. |
| 8,287,945 B2 | 10/2012 | Takamura et al. |
| 8,383,722 B2 | 2/2013 | Takamura et al. |
| 8,410,211 B2 | 4/2013 | Takamura et al. |
| 2002/0082319 A1 | 6/2002 | Zhao et al. |
| 2003/0139522 A1 | 7/2003 | Koppers et al. |
| 2003/0215286 A1 | 11/2003 | Takamura |
| 2004/0106725 A1 | 6/2004 | Antonucci et al. |
| 2007/0082983 A1 | 4/2007 | Crews et al. |
| 2007/0238820 A1 | 10/2007 | Burghart et al. |
| 2007/0238823 A1 | 10/2007 | Takamura et al. |
| 2007/0238825 A1 | 10/2007 | Takamura et al. |
| 2009/0084287 A1* | 4/2009 | Partanen et al. ........... 106/273.1 |
| 2009/0092846 A1 | 4/2009 | Takamura et al. |
| 2009/0252972 A1 | 10/2009 | Burghart et al. |
| 2010/0047015 A1* | 2/2010 | Takamura et al. .............. 404/31 |
| 2010/0206196 A1* | 8/2010 | Crews et al. ................. 106/276 |
| 2012/0077909 A1* | 3/2012 | Takamura et al. ............ 524/114 |

(Continued)

FOREIGN PATENT DOCUMENTS

| DE | 19503099 | 8/1995 |
| EP | 0156971 | 11/1988 |

(Continued)

OTHER PUBLICATIONS

Capek, Ignác, "Sterically and Electrosterically Stabilized Emulsion Polymerization Kinetics and Preparation, Advances in Colloid and Interface Science," Elsevier Science B.V., vol. 99, 2002, pp. 77-162.
International Search Report and Written Opinion, mailed Jul. 24, 2007, in International Application No. PCT/US2007/065935, 6 pages.
International Search Report and Written Opinion, mailed Aug. 27, 2007, in International Application No. PCT/US2007/065934, 7 pages.

(Continued)

*Primary Examiner* — Raymond W Addie
(74) *Attorney, Agent, or Firm* — Meunier Carlin & Curfman LLC

(57) ABSTRACT

A composition for use in a pavement surface, comprises (a) asphalt in an amount of from 40 to 70 parts by weight; (b) an electrically neutral copolymer in an amount of from greater than 0 to 10 parts by weight; (c) an emulsifier in an amount of from 0.1 to 4 parts by weight; (d) an acid or a base in an amount of from 0.1 to 4 parts by weight; and (e) water in an amount of from 25 to 60 parts by weight. A method of making a composition, a method of applying a composition, and a paved surface is also disclosed.

15 Claims, No Drawings

(56) References Cited

U.S. PATENT DOCUMENTS

| | | | |
|---|---|---|---|
| 2013/0029101 A1* | 1/2013 | Trewalla et al. | 428/143 |
| 2013/0253133 A1 | 9/2013 | Takamura et al. | |

FOREIGN PATENT DOCUMENTS

| | | |
|---|---|---|
| EP | 0795591 | 9/1997 |
| JP | H05-271314 | 10/1993 |
| JP | H10-060368 | 3/1998 |
| JP | 11-343184 | 12/1999 |
| JP | 2000-017007 | 1/2000 |
| JP | 2000290464 | 10/2000 |
| JP | 2001335721 | 12/2001 |
| JP | 2002-097214 | 4/2002 |
| JP | 2002-179913 | 6/2002 |
| JP | 2009-533305 | 9/2009 |
| WO | 2007118112 | 10/2007 |

OTHER PUBLICATIONS

International Search Report and Written Opinion, mailed May 23, 2012, in International Application No. PCT/US2012/023715, 7 pages.

Material Safety Data Sheet for IGEPAL CA-630, Rhodia, Inc., Apr. 18, 2001, 1 page.

Odian, George, "Principles of Polymerization 365," J. Wiley & Sons, 4th edition, 2004, 4 pages.

Schick, Martin J., "Nonionic Surfactants," surfactant science series, Physical Chemistry, vol. 23, 1987, 4 pages.

Takamura, Koichi, "Polymer Colloids," Kirk-Othmer Encyclopedia of Chemical Technology, J. Wiley & Sons, 2001, 23 pages.

* cited by examiner

COMPOSITIONS COMPRISING ASPHALT AND ELECTRICALLY NEUTRAL COPOLYMER DISPERSIONS

BACKGROUND

Asphalt compositions such as asphalt emulsions can be used in the production of paved surfaces. One issue in the use of these asphalt compositions is that they can produce "tracking." For example, a tack or bonding coat also can be applied to a base or substrate layer in advance of the application of the next pavement layer. In the meantime, construction or other vehicles are expected to travel over the tack coat without significantly damaging or reducing the effectiveness of the coating. Such damage often occurs, however, when the tack or bonding coating is picked up on the tires or tracks of vehicles traveling over the coated surface. Where this occurs, the asphalt compositions often are tracked onto other pavement surfaces causing disruption to the surrounding area. This tracking also reduces the effectiveness of the tack coat by displacing a portion of the intended volume from the area awaiting a new pavement layer.

Insufficient adhesion between a new layer of pavement and an existing base course, a previously laid pavement layer, or a prepared pavement surface can cause pavement separation and cracking during construction of the structure, as well as subsequent failures and premature deterioration of the pavement structure and/or surface. Such conditions often require costly repairs, can cause damage to vehicles traveling on the surface and may cause dangerous traffic conditions threatening damage to property and injury to vehicle passengers.

In addition, certain asphalt products can require a relatively long cure time (as long as 2 to 7 days or more) before traffic is permitted to pass over the treated area. When the next pavement layer cannot be laid down immediately, the cured tack coat remains exposed for extended periods and remains tacky and sticky. Accordingly, vehicle traffic over the treated surfaces often must be shut down until another layer of pavement is applied, and if traffic is allowed to pass, the asphalt tack coatings frequently adheres to the tires and tracks of vehicles traveling over the coated surfaces. This frequently results in lifting and damage to the tack coat and undesirable tracking of the coating to other surfaces via the vehicle tires and tracks.

Damage to the tack coating can substantially interfere with the ability of the coating to properly bond and/or fuse the pavement layers or base together. As a result, the pavement layers may slip or separate with the passage of traffic over the structure and time. This type of damage also may permit water penetration into the pavement surface, which can result in further deterioration due to freeze-thaw cycles or similar stresses. As a result, multiple applications of the tack coat may be required to obtain the desired adhesion between the pavement layers at a significant loss of efficiency and increase in cost. Furthermore, where the coatings are tracked to other surfaces by vehicles, extensive cleanup may be required adding to the expense of a project.

SUMMARY

A composition is provided for use in a pavement surface, comprising (a) asphalt in an amount of from 40 to 70 parts by weight; (b) an electrically neutral copolymer in an amount of from greater than 0 to 10 parts by weight; (c) an emulsifier in an amount of from 0.1 to 4 parts by weight; (d) an acid or a base in an amount of from 0.1 to 4 parts by weight; and (e) water in an amount of from 25 to 60 parts by weight. In some embodiments, the asphalt is present in an amount of from 58 to 62 parts by weight, the copolymer is present in an amount of from 2 to 6 parts by weight, the emulsifier is present in an amount of from 0.75 to 3 parts by weight, and the acid or base is present in an amount of from 0.75 to 3 parts by weight.

In some embodiments, the electrically neutral copolymer includes a styrene acrylic copolymer or a pure acrylic copolymer derived from monomers including one or more (meth)acrylates and optionally styrene. The one or more (meth)acrylates can include butyl acrylate. In some embodiments, the copolymer is derived from at least one monomer comprising amide and/or hydroxy groups. In some embodiments, the copolymer is not derived from ionic monomers. The electrically neutral copolymer can be present in an amount of from 1 to 7 parts by weight or from 3 to 6 parts by weight.

In some embodiments, the asphalt is present in an amount of from 55 to 70 parts by weight. The composition can include up to 15 parts by weight of one or more aromatic recycling agents or non-asphaltic rosin materials. In some embodiments, wherein the emulsifier includes a cationic emulsifier, the acid or base comprises an acid. For example, the cationic emulsifier can include an amine-based emulsifier and the acid can include hydrochloric acid. In some embodiments, wherein the emulsifier includes an anionic emulsifier, the acid or base comprises a base. For example, the anionic emulsifier can include a fatty acid-based emulsifier and the base can include sodium hydroxide. The composition can further comprise aggregate and/or up to 5 parts by weight of one or more additives.

A method of producing a paved surface is also disclosed herein, that comprises producing a composition by mixing (a) asphalt in an amount of from 40 to 70 parts by weight, (b) an electrically neutral copolymer in an amount of from greater than 0 to 10 parts by weight, (c) an emulsifier in an amount of from 0.1 to 4 parts by weight, (d) an acid or base in an amount of from 0.1 to 4 parts by weight, and (e) water in an amount of from 25 to 60 parts by weight; and applying the composition to a surface. The composition can be as described above. In some embodiments, the electrically neutral copolymer can be pre-mixed with an anionic emulsifier or a cationic emulsifier to produce a charged latex copolymer prior to mixing the asphalt and the acid or base with the emulsifier and the electrically neutral copolymer. The composition can be applied directly to a paved surface or applied to an unpaved surface. In some embodiments, aggregate is blended with the composition prior to applying the composition to the surface. Alternatively, aggregate can be applied to the composition after the composition is applied to the surface. In some embodiments, the composition is applied to an existing paved layer as a tie layer, and a new layer comprising asphalt is applied to the tie layer. The electrically neutral copolymer can be prepared by polymerizing one or more copolymerizable nonionic monomers at a polymerization temperature in the presence of a nonionic surfactant, wherein the cloud point temperature of the nonionic surfactant is less than the polymerization temperature. In some embodiments, the electrically neutral copolymer is prepared by polymerizing one or more copolymerizable nonionic monomers in the presence of a nonionic surfactant comprising alkylene oxide adduct of an alkyl alcohol, alkylbenzene alcohol or dialkylbenzene alcohol wherein the number of alkylene oxide groups is less than or equal to 14, said copolymer not being derived in the presence of ionic surfactants.

A paved surface layer is also described, comprising asphalt in an amount of from 40 to 70 parts by weight, an electrically neutral copolymer in an amount of from greater than 0 to 10 parts by weight, an emulsifier in an amount of from 0.1 to 4 parts by weight, and an acid or base in an amount of from 0.1 to 4 parts by weight.

A paved surface is also described, comprising (a) a first layer comprising asphalt; (b) a tie layer provided on the first layer, comprising asphalt in an amount of from 40 to 70 parts by weight, an electrically neutral copolymer in an amount of from greater than 0 to 10 parts by weight, an emulsifier in an amount of from 0.1 to 4 parts by weight, and an acid or base in an amount of from 0.1 to 4 parts by weight; and (c) a second layer comprising asphalt provided on the tie layer.

The details of one or more embodiments are set forth in the accompanying drawings and the description below. Other features, objects, and advantages will be apparent from the description and drawings, and from the claims.

DETAILED DESCRIPTION

As used herein, the prefix "(meth)acryl . . . " includes both "methacryl . . . " and "acryl . . . ".

A composition for use in a pavement surface is disclosed herein. The composition includes (a) asphalt in an amount of from 40 to 70 parts by weight; (b) an electrically neutral copolymer in an amount of from greater than 0 to 10 parts by weight; (c) an emulsifier in an amount of from 0.1 to 4 parts by weight; (d) an acid or a base in an amount of from 0.1 to 4 parts by weight; and (e) water in an amount of from 25 to 60 parts by weight.

The asphalt used in the composition is also commonly known as bitumen. The asphalt can be provided in the composition in an amount of from 40 to 70 parts by weight. For example, the asphalt can be provided in an amount greater than 40 parts, greater than 45 parts, greater than 50 parts, greater than 55 parts and less than 70 parts, less than 65 parts and less than 60 parts by weight. In some embodiments, the asphalt can be provided in an amount of 55 to 70 parts by weight. In the composition, the asphalt can have a mean particle diameter of 1 to 10 microns, for example, from 2 to 3 microns. A portion of the 40 to 70 parts by weight of asphalt can be replaced by aromatic recycling agents, non-asphaltic rosin materials, or mixtures thereof. For example, the composition can include up to 15% of aromatic recycling agents, non-asphaltic rosin materials, or mixtures thereof. For example, the composition can include greater than 0% or less than 15%, for example, greater than 1%, greater than 2%, greater than 3%, greater than 4%, or greater than 5%, or less than 14%, less than 13%, less than 12%, less than 11%, or less than 10% aromatic recycling agents, non-asphaltic rosin materials, or mixtures thereof.

In some embodiments, the asphalt is a low or medium pen asphalt having a pen value of greater than 40 dmm and softening point less than 60° C. The pen value is based on penetration testing where the relative hardness of the asphalt composition is determined at a predetermined temperature, typically about 25° C. One test uses methods such as those described in ASTM D5 (ASTM International) and AASHTO T49 (American Association of State Highway and Transportation Officials). This test measures the distance in dmm (tenths of a millimeter) that a standard needle, under a standard loading, will penetrate a sample in a given time under known temperature conditions. The resulting distance is often referred to as the penetration or "pen" value. The Ring and Ball Softening Point test uses methods, such as those described in ASTM D36 and/or AASHTO T53, to measure the temperature at which an asphalt composition becomes soft and flowable. As used herein, pen values and softening point values are with reference to the above identified ASTM and AASHTO methods or their equivalents.

The electrically neutral copolymer can be prepared using a dispersion, mini-emulsion, or emulsion polymerization process. In some embodiments, an emulsion polymerization process is used. The emulsion polymerization process can be continuous, batch, or semi-batch. In some embodiments, a semi-batch process is used. The process can use a single reactor or a series of reactors as would be readily understood by those skilled in the art. For example, a review of heterophase polymerization techniques is provided in M. Antonelli and K. Tauer, Macromol. Chem. Phys. 2003, vol. 204, p 207-219.

A copolymer dispersion can be prepared by first charging a reactor with a seed latex, water, and optionally at least one nonionic surfactant and/or at least one of the monomers and/or portions thereof. The seed latex helps initiate polymerization and helps produce a polymer having a consistent particle size. Any seed latex appropriate for the specific monomer reaction can be used such as a polystyrene seed. The initial charge can also include a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the reaction temperature, for example, to between 50° C. and 100° C. In some embodiments, the initial charge is heated to a temperature between 70° C. and 95° C.

After the initial charge, the monomers that are to be used in the polymerization can be continuously fed to the reactor in one or more monomer feed streams. The monomers can be supplied as a pre-emulsion in an aqueous medium, particularly if acrylate monomers are used in the polymerization. Typically, an initiator feed stream is also continuously added to the reactor at the time the monomer feed stream is added although it may also be desirable to include at least a portion of the initiator solution to the reactor prior to adding a monomer pre-emulsion if one is used in the process. The monomer and initiator feed streams are typically continuously added to the reactor over a predetermined period of time (e.g. 1.5-5 hours) to cause polymerization of the monomers and to thereby produce the polymer dispersion. A nonionic surfactant and any other surfactants are also typically added at this time as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

As mentioned above, the monomer feed stream can include one or more monomers. The monomers can be fed in one or more feed streams with each stream including one or more of the monomers being used in the polymerization process. For example, styrene and butadiene (when used) can be provided in separate monomer feed streams or can be added as a pre-emulsion. It can also be advantageous to delay the feed of certain monomers to provide certain polymer properties or to provide a layered or multiphase structure (e.g. a core/shell structure). Although one monomer could be provided in the polymerization process to produce a homopolymer, typically two or more monomers are copolymerized to produce a copolymer.

The monomers used to produce the electrically neutral copolymer include nonionic monomers. Exemplary nonionic monomers include styrene, C1-C20 alkyl and C2-C20 hydroxyalkyl esters of acrylic and methacrylic acid (e.g. ethyl acrylate, ethyl methacrylate, methyl methacrylate, 2-ethylhexyl acrylate, butyl acrylate, butyl methacrylate, hydroxypropyl acrylate, hydroxypropyl methacrylate, dimethylhydroxypropyl (meth)acrylate, 2-hydroxyethyl acrylate, hydroxyethyl methacrylate, and 2-hydroxybutyl methacrylate), 2-acetoacetoxyethyl methacrylate (AAEM), 1,4-butanediyl diacrylate, acrylamide, methacrylamide, N-methylacrylamide, N,N-dimethylacrylamide, N,N-diethylacrylamide, N-isopropylacrylamide, N-t-butylacrylamide, N-methylolacrylamide, N-vinylformamide, N-vinylmethylacetamide, vinyl esters (e.g. vinyl acetate, vinyl propionate, vinyl butyrate, and vinyl caprolate), divinylbenzene, vinyltriethoxysilane, t-butylstyrene, isopropylstyrene, p-chlorostyrene, acrylonitrile, methacrylonitrile, C4-C8 dienes (e.g. butadiene and isoprene), vinyl chloride, vinylidene chloride, ethylene, propylene, butylene, and the like, and mixtures thereof. The monomers can include cross-linking monomers, such as butanediene, 1,4-butanediyl diacrylate, and divinylbenzene.

The monomers can also include a small amount (0.5% by weight or less, based on the total monomer weight) of one or more ionic monomers. Exemplary monomers include carboxylic acid monomers (e.g. itaconic acid, fumaric acid, and (meth)acrylic acid).

The electrically neutral copolymer used in the composition can include a styrene acrylic, pure or straight acrylic, a styrene butadiene, or a vinyl acetate copolymer. In one embodiment, the monomers include styrene and at least one monomer selected from the group consisting of (meth)acrylate monomers, to produce a styrene-acrylic latex. The meth(acrylate) monomers include one or more monomers selected from the group consisting of 2-ethylhexylacrylate, n-butyl acrylate, and methyl methacrylate. The monomers can also include acrylamide, methacrylamide and derivatives thereof (e.g. N-methylacrylamide, N,N-dimethylacrylamide, N,N-diethylacrylamide, N-isopropylacrylamide, N-t-butylacrylamide, and N-methylolacrylamide) to increase the stability of the dispersion.

In one embodiment, a pure or straight acrylic polymer can be produced using the acrylate and methacrylate monomers listed above. For the straight acrylics, methacrylamide or derivatives thereof can also be added to increase the stability of the dispersion.

In one embodiment, the monomers polymerized include styrene and butadiene to produce a styrene-butadiene latex. In addition to styrene and butadiene, the monomers can optionally include at least one additional monomer. For example, (meth)acrylamide or derivatives thereof can be added to increase the dispersion or colloidal stability of the dispersion. Furthermore, monomers such as (meth)acrylate ester monomers can be added, including 2-ethylhexylacrylate, n-butyl acrylate, and methyl methacrylate.

In one embodiment, the monomers polymerized include vinyl acetate and optionally at least one additional monomer. For example, the vinyl acetate can be combined with the acrylate and methacrylate monomers listed above to produce a vinyl acrylic copolymer. Alternatively, in some embodiments, the vinyl acetate can be combined with ethylene to produce an ethylene vinyl acetate copolymer.

In some embodiments, the copolymer is derived from at least one nonionic monomer comprising amide and/or hydroxy groups. Suitable monomers including an amide and/or hydroxy group include (meth)acrylamide and derivatives thereof and hydroxyalkyl acrylic esters (e.g., hydroxyethyl methacrylate). These monomers can be used, for example, to increase the stability of the dispersion.

The molecular weight of the copolymers can be adjusted by adding a small amount of molecular weight regulators, for example, up to 2% by weight, based on the monomers being polymerized. Particular regulators which can be used include organic thio compounds (e.g., tert-dodecylmercaptan), allyl alcohols and aldehydes.

The initiator feed stream can include at least one initiator or initiator system that is used to cause the polymerization of the monomers in the monomer feed stream. The initiator stream can also include water and other desired components appropriate for the monomer reaction to be initiated. The initiator can be any initiator known in the art for use in emulsion polymerization such as azo initiators; ammonium, potassium or sodium persulfate; or a redox system that typically includes an oxidant and a reducing agent. Commonly used redox initiation systems are described, e.g., by A. S. Sarac in *Progress in Polymer Science* 24, 1149-1204 (1999). Exemplary initiators include azo initiators and aqueous solutions of sodium persulfate. The initiator stream can optionally include one or more buffers or pH regulators, such as those described above.

In addition to the monomers and initiator, a nonionic surfactant (i.e., nonionic emulsifier) is fed to the reactor. The nonionic surfactant can be provided in the initial charge of the reactor, provided in the monomer feed stream, provided in an aqueous feed stream, provided in a pre-emulsion, provided in the initiator stream, or a combination thereof. The nonionic surfactant can also be provided as a separate continuous stream to the reactor. The nonionic surfactant is can be provided in an amount of 1-5% by weight, based on the total weight of monomer and surfactant. In some embodiments, the nonionic surfactant is provided in an amount less than 2% by weight. The term "nonionic" as used herein refers to materials that do not dissociate in the dispersion into positively and negatively charged species.

Suitable nonionic surfactants include polyoxyalkylene alkyl ethers and polyoxyalkylene alkylphenyl ethers (e.g. diethylene glycol monoethyl ether, diethylene glycol diethyl ether, polyoxyethylene lauryl ether, polyoxyethylene stearyl ether, and polyoxyethylene nonylphenyl ether); oxyethylene-oxypropylene block copolymers; sorbitan fatty acid esters (e.g. sorbitan monolaurate available as SPAN® 20 from Merck Schuchardt OHG, sorbitan monooleate available as SPAN® 80 from Merck Schuchardt OHG, and sorbitan trioleate available as SPAN® 85 from Merck Schuchardt OHG); polyoxyethylene sorbitan fatty acid esters (e.g. polyoxyethylene sorbitan monolaurate available as TWEEN® 20 and TWEEN® 21 from Uniqema, polyoxyethylene sorbitan monopalmitate available as TWEEN® 40 from Uniqema, polyoxyethylene sorbitan monostearate available as TWEEN® 60, TWEEN® 60K, and TWEEN® 61 from Uniqema, polyoxyethylene sorbitan monooleate available as TWEEN® 80, TWEEN® 80K, and TWEEN® 81 from Uniqema, and polyoxyethylene sorbitan trioleate available as TWEEN® 85 from Uniqema); polyoxyethylene sorbitol fatty acid esters (e.g. tetraoleic acid polyoxyethylene sorbitol); glycerin fatty acid esters (e.g. glycerol monooleate); polyoxyethylene glycerin fatty acid esters (e.g. monostearic acid polyoxyethylene glycerin and monooleic acid polyoxyethylene glycerin); polyoxyethylene fatty acid esters (e.g. polyethylene glycol monolaurate and polyethylene glycol monooleate); polyoxyethylene alkylamine; and acetylene glycols. In some embodiments, the nonionic surfactant can have a HLB (hydrophilic lipophilic balance) at room temperature such that 8<HLB<15. In some embodiments, the HLB is 14 or less.

In some embodiments, the nonionic surfactant includes an ethylene oxide $(EO)_m$ and/or propylene oxide $(PO)_n$ adduct of an alkyl, alkylbenzene or dialkylbenzene alcohol wherein $(m+n) \leq 14$, $(m+n) \leq 12$, or $(m+n) \leq 10$ (e.g. $6 \leq (m+n) \leq 10$). The nonionic surfactant can comprise an ethylene oxide adduct of an alcohol (with n=0), a propylene oxide adduct of an alcohol (with m=0), or a combination of ethylene oxide and propylene oxide (with m>0 and n>0) adduct of an alcohol. In the event m>0 and n>0, the ethylene oxide and propylene oxide can be provided as a random or a block copolymer. In some embodiments, the nonionic surfactant is an ethylene oxide adduct of an alkyl alcohol, with n=0. The alkyl alcohol can be a branched or straight chain hydrocarbon having a single hydroxyl group, e.g., a terminal hydroxyl group, that is ethoxylated. In some examples, the alkyl group can include 10 to 22 carbon atoms or 10 to 16 carbon atoms. Suitable nonionic emulsifiers include ethylene oxide $(EO)_m$ adducts of tridecyl alcohol, wherein m=6, 8, or 10, such as those available from BASF under the LUTENSOL™ trademark.

In some embodiments, the nonionic surfactant has a cloud point temperature below the polymerization temperature used to produce the polymer dispersion when the polymerization is in an aqueous solution. The cloud point temperature, also known as a cloud point, cloud temperature, or solubility inversion temperature, is the temperature at which the nonionic surfactant solution becomes cloudy (i.e., at and above that temperature the solution appears cloudy or turbid). As used herein, the cloud point temperature refers to the cloud point of a 1% aqueous solution of the surfactant. As used herein, the cloud point temperature is determined using ASTM D-2024-65R03. In some embodiments, the cloud point temperature for a 1% aqueous solution of the nonionic surfactant is from 30° C. to 90° C. or from 35° C. to 85° C.

One or more amphoteric surfactants (emulsifiers) can also be used in the polymerization step in addition to or in place of the nonionic surfactants discussed above. Suitable amphoteric surfactants include betaine acetate, amide betaine, sulfobetaine, imidazolium betaine, and amine oxides. Suitable amphoteric surfactants are also described in U.S. Pat. No. 6,540,822, which in incorporated herein by reference. An exemplary amphoteric surfactant is REDICOTE® E-7000 surfactant, which is available from Akzo Nobel.

An anionic surfactant is typically not included in the emulsion polymerization reaction. Furthermore, a cationic surfactant is typically not used in the emulsion polymerization reaction.

Once polymerization is completed, the polymer dispersion can be chemically stripped thereby decreasing its residual monomer content. This stripping process can include a chemical stripping step and/or a physical stripping step. In some embodiments, the polymer dispersion is chemically stripped by continuously adding an oxidant such as a peroxide (e.g. t-butylhydroperoxide) and a reducing agent (e.g. sodium acetone bisulfite), or another redox pair to the reactor at an elevated temperature and for a predetermined period of time (e.g. 0.5 hours). Suitable redox pairs are described by A. S. Sarac in *Progress in Polymer Science* 24, 1149-1204 (1999). An optional defoamer can also be added if needed prior to or during the stripping step. In a physical stripping step, a water or steam flush can be used to further eliminate the non-polymerized monomers in the dispersion. Once the stripping step is completed, the pH of the polymer dispersion can be adjusted and a biocide or other additives can be added. Cationic, anionic, and/or amphoteric surfactants may optionally be added after the stripping step or at a later time if desired in the end product to provide a cationic or anionic polymer dispersion.

In some embodiments, the polymer particles of the resultant polymer dispersion have an average particle size from 100 to 500 nm or from 130-250 nm. In some embodiments, the polymer particles are characterized by having a narrow particle size distribution. For example, the resultant volume-average distribution of polymer particles in the polymer dispersion can have a standard deviation of less than 30%.

Once the polymerization reaction is complete, and the stripping step is completed, the temperature of the reactor can be reduced, thus making the nonionic surfactant water-soluble. While not wishing to be bound by theory, it is believed that the hydrocarbon chain of the nonionic surfactant immobilizes the surfactant into the monomer swollen particles, and the surfactant becomes physically trapped in the polymer chain. On the other hand, it is believed that the hydrophilic $(EO)_m$ and/or $(PO)_n$ chain remains at the polymer particle/water interface and extends towards the water phase, providing colloidal stability for the polymer dispersion. Therefore, though the temperature is below the cloud point temperature of the nonionic surfactant, the surfactant molecules do not migrate to the water phase. Thus, because there are limited amounts of free nonionic surfactant in the water phase of the latex, it is believed that the mechanical properties of the dried film are not adversely affected by the presence of the nonionic surfactants.

The polymer dispersion following the polymerization step can be characterized as "electrically neutral" in that there are no charged groups added to produce the polymer or there is a balance of anionic and cationic charged groups in the polymer. The electrophoretic mobility (μ) of the polymer dispersion can be used to measure the zeta potential to show the charge of the polymer dispersion although it is noted that the measurement may indicate an anionic character even though the polymer dispersion is electrical neutral. For example, the resulting polymer dispersion can have a low negative surface charge due to the presence of grafted sulfate groups when a persulfate initiator is used or due to water molecules being absorbed to the polymer surface. However, the polymer dispersion would be classified as an electrically neutral polymer dispersion as it is neutral and non-ionic in terms of the dispersion stability and acts with a nonionic character upon addition of anionic or cationic surfactants, electrolytes, or high valency electrolytes. Examples of dispersions that are electrically neutral in terms of dispersion stability and act with a nonionic character, but have ionic zeta potential measurements are provided in S. Usui, Y. Imamura and E. Barouch, Destabilization of oil-in-water emulsion with inorganic electrolytes in the absence and in the presence of sodium dodecyl sulfate, J. Dispersion Science and Technology 8(4), 359-384 (1987) (measured zeta potential of decane particles as a function of electrolyte concentration show strongly negatively charged even without the anionic surfactant) and S. Usui and H. Sasaki, Zeta potential measurements of bubbles in aqueous surfactant solutions, J. Colloid and Interface Science, 65(1), 36-45 (1978) (zeta potential of argon gas bubbles in the presence of nonionic surfactant $C_{12}POE$ measures highly negative).

The copolymer dispersions prepared with nonionic surfactants and nonionic copolymerizable monomers as described herein can be combined with cationic or anionic surfactant solutions or electrolytes over a wide range of pH values without causing coagulation. Therefore, both anionic (negatively charged) and cationic (positively charged) polymer dispersions can be produced using most of the same conventional emulsion polymerization equipment at the same production facility without causing coagulation and other problems associated with cross-contamination. The copolymer dispersions can also be combined with polymer dispersions having cationic or anionic charges in a blend ratio of greater than 0% to 30% of the charged dispersion to the electrically neutral polymer dispersion to produce a cationic or anionic polymer emulsion.

In some embodiments, the polymerization step can be a nonionic process where only nonionic monomers and surfactants are used in the polymerization process. Alternatively, the polymerization step can include one or more amphoteric surfactants that do not provide an overall charge to the polymer dispersion. Due to the electrically neutral nature, the resulting polymer dispersion exhibits tolerance to charged chemical species, and it is colloidally stable in high-electrolyte media, such as a one molar calcium chloride solution. The resulting polymer can be combined with a cationic or anionic surfactant or electrolyte to produce a charged polymer dispersion.

The electrically neutral copolymer can be provided as an aqueous copolymer dispersion in water comprising 30-75% solids, 40-70% or 50-65% by weight solids. The electrically neutral copolymer can be present in an amount of from greater than 0 to 10 parts by weight in the composition. The electrically neutral copolymer can be present in an amount of from greater than 1 part, greater than 1.5 parts, greater than 2 parts, greater than 2.5 parts, or greater than 3 parts, or less than 10 parts, less than 9 parts, less than 8 parts, less than 7 parts, less than 6 parts, less than 5 parts, less than 4.5 parts, less than 4 parts, less than 3.5 parts, or less than 3 parts by weight. In some embodiments, the electrically neutral copolymer is present in an amount of from 1 to 7 parts by weight or from 3 to 6 parts by weight.

The emulsifier used in the composition can be added prior to or during polymerization (as described above) and/or can be blended with the asphalt, electrically neutral copolymer, and acid or base as would be understood to those skilled in the art. The emulsifier can include anionic, cationic, nonionic, or amphoteric emulsifiers. For example, the emulsifier can include a mixture of one or more nonionic emulsifiers, a mixture of one or more nonionic emulsifiers and one or more anionic emulsifiers, a mixture of one or more anionic emulsifiers, a mixture of one or more nonionic emulsifiers and one or more cationic emulsifiers, or a mixture of one or more cationic emulsifiers. Any of these mixtures could also include amphoteric emulsifiers.

Suitable nonionic emulsifiers include the surfactants described above that are provided prior to or during polymerization. In addition, any of the nonionic emulsifiers can be post-added after the copolymer dispersion is prepared.

An anionic emulsifier can be provided in the composition. Suitable anionic emulsifiers include fatty acids, alkyl sulfates, alkyl ether sulfates, alkyl benzene sulfonic acid, alkyl phosphoric acid or salts thereof, and sucrose esters. Anionic polyelectrolytes such as tartrates, borates, oxalates and phosphates, can also be used in the composition. Additional suitable anionic surfactants and polyelectrolytes include but are not limited to M28B and other anionic surfactants available from MeadWestvaco under the INDULIN® trademark (such as INDULIN® AMS, INDULIN® SA-L, INDULIN® ISE, INDULIN® 201, INDULIN® 202, and INDULIN® 206); anionic surfactants available from Akzo Nobel under the REDICOTE® trademark (such as REDICOTE® E-15 and REDICOTE® E-62C); and lignosulfonates such as those available under the MARASPERSE™ trademark (such as MARASPERSE™ CBOS-3 and MARASPERSE™ N22). In some embodiments, the emulsifier includes an anionic fatty acid-based emulsifier. In some embodiments, an anionic emulsifier is mixed with the electrically neutral copolymer dispersion to produce an anionically charged copolymer. In some embodiments, the mixing occurs prior to adding the base and/or the asphalt.

A cationic emulsifier can be provided in the composition. The cationic emulsifiers can be classified as cationic rapid setting (CRS), cationic quick setting (CQS), cationic medium setting (CMS), or cationic slow setting (CSS) emulsifiers and these classifications are known in the art and can be readily measured in an emulsion as set forth in ASTM D977 and D2397. In some embodiments, cationic polyelectrolytes can be provided in the composition. Suitable cationic emulsifiers and polyelectrolytes include alkylamine salts, quaternary ammonium salts, cationic surfactants available from Akzo Nobel under the REDICOTE® trademark (such as REDICOTE® 4819, REDICOTE® E-64R, REDICOTE® E-5, REDICOTE® E-9, REDICOTE® E9A, REDICOTE® E-11, REDICOTE® E-16, REDICOTE® E-44, REDICOTE® E-120, REDICOTE® E-250, REDICOTE® E-2199, REDICOTE® E-4868, REDICOTE® C-346, REDICOTE® C-404, REDICOTE® C-450, and REDICOTE® C-471), cationic surfactants available from MeadWestvaco under the INDULIN® and AROSURF® trademarks (such as INDULIN® 814, INDULIN® AMS, INDULIN® DF-30, INDULIN® DF-40, INDULIN® DF-42, INDULIN® DF-60, INDULIN® DF-80, INDULIN® EX, INDULIN® FRC, INDULIN® MQK, INDULIN® MQK-1M, INDULIN® MQ3, INDULIN® QTS, INDULIN® R-20, INDULIN® SBT, INDULIN® W-1, and INDULIN® W-5), ASFIER® N480 available from Kao Specialties Americas, CYPRO™ 514 available from Cytec Industries, polyethyleneimines such as those available from BASF under the POLYMIN® trademark (such as POLYMIN® SK, POLYMIN® SKA, POLYMIN® 131, POLYMIN® 151, POLYMIN® 8209, POLYMIN® P, and POLYMIN® PL), and polyvinylamines such as those available from BASF under the CATIOFAST® trademark (such as CATIOFAST® CS, CATIOFAST® FP, CATIOFAST® GM, and CATIOFAST® PL). Other suitable cationic polyelectrolytes and surfactants include those listed in U.S. Pat. Nos. 5,096,495, 5,160,453, and 5,443,632. In some embodiments, the cationic emulsifier includes an amine-based emulsifier. In some embodiments, a cationic emulsifier is mixed with the electrically neutral copolymer dispersion to produce a cationically charged copolymer. In some embodiments, the mixing occurs prior to adding the acid and/or the asphalt.

An amphoteric emulsifier can be provided in the composition. Suitable amphoteric emulsifiers are described above.

The emulsifier can be present in an amount of from 0.1 to 4 parts by weight. For example, the emulsifier can be provided in an amount of 0.15 parts or greater, 0.25 parts or greater, 0.5 parts or greater, 0.75 parts or greater, or 1 part or greater or can be provided in an amount of 3 parts or less, 2.5 parts or less, 2 parts or less, 1.5 parts or less, 1 part of less, 0.5 parts or less, or 0.35 parts or less. In some embodiments, the emulsifier is provided with water.

The composition can include an acid or a base. The acid or base is typically diluted with water for use in the composition. For compositions that include an anionic emulsifier, a base can be included in the composition. For example, sodium hydroxide can be included in the composition. In these embodiments, the composition can have a pH from 10.5 to 13. For compositions that include a cationic emulsifier, an acid can be included in the composition. For example, hydrochloric acid can be included in the composition. In these embodiments, the composition can have a pH from 2 to 4. In some embodiments, nonionic emulsifiers can be used with an acid or base (for example, without anionic or cationic emulsifiers). The acid or base can be provided in an amount of from 0.1 to 4 parts by weight and can be diluted with water for use in the composition. For example, the acid or base can be provided in an amount of greater than 0.1 parts, greater than 0.15 parts, greater than 0.2 parts, greater than 0.25 parts, greater than 0.3 parts, greater than 0.35 parts, greater than 0.4 parts, greater than 0.45 parts, greater than 0.5 parts, greater than 0.55 parts, greater than 0.6 parts, greater than 0.65 parts, greater than 0.7 parts, or greater than 0.75 parts, or less than 4 parts, less than 3.5 parts, less than 3 parts, less than 2.5 parts, less than 2 parts, less than 1.5 parts, less than 1 part, less than 0.5 parts, or less than 0.35 parts by weight. The acid or base can be provided in an amount to provide the pH values provided herein.

The composition includes water. The water can be provided with any of the components of the composition, i.e., the asphalt (in the form of an asphalt emulsion, the electrically neutral copolymer, the emulsifier, or the acid or base. In some embodiments, the water is added by itself to the composition. The water is present in the composition in an amount of from 25 to 60 parts by weight. For example, the water can be present in an amount of greater than 25 parts, greater than 30 parts, greater than 35 parts or greater than 40 parts, or less than 60 parts, less than 55 parts, less than 50 parts, less than 45 parts, or less than 40 parts by weight. In some embodiments, the composition is substantially free of organic solvents (includes less than 1 part) or does not include organic solvents.

The composition can further include one or more additives. For example, they can include up to 5 parts by weight of one or more additives. Suitable additives include inorganic salts, thickeners and fillers. Inorganic salts can be added, for example to improve emulsifiability, in an amount of up to 1 part by weight. Suitable inorganic salts include sodium chloride, potassium chloride, calcium chloride, aluminum chloride and mixtures thereof. Thickeners can be added in an amount of up to 0.5 parts by weight and can include associative thickeners, polyurethanes, alkali swellable latex thickeners, cellulose, cellulose derivatives, modified cellulose products, plant and vegetable gums, starches, alkyl amines, polyacrylic resins, carboxyvinyl resins, polyethylene maleic anhydrides, polysaccharides, acrylic copolymers, hydrated lime (such as cationic and/or nonionic lime), or mixtures thereof. Fillers such as mineral fillers and carbon black can be included in an amount of up to 5 parts by weight or up to 2 parts by weight. For example, the filler can be provided in an amount of 0.1 part of greater or 0.5 parts or greater. The carbon black can be used to blacken the composition as is desired, for example, in fog seal applications. The mineral filler can be provided as a fine powder and can be used, for example, to increase the set rate of the asphalt emulsion or to reduce or prevent bleeding of the asphalt. Suitable mineral fillers include hydrated lime, limestone dust, Portland cement, silica, alum, fly ash, and combinations thereof. Mineral filler generally refers to a finely divided mineral product wherein at least 65 percent of which will pass through a No. 200 sieve, and typically has an average size that is less than 0.003 inches.

The composition can also include aggregate. The aggregate can be of varying sizes as would be understood by those of skill in the art. Any aggregate which is traditionally employed in the production of bituminous paving compositions can be used, including dense-graded aggregate, gap-graded aggregate, open-graded aggregate, reclaimed asphalt pavement, and mixtures thereof. Dense-graded aggregate exhibits the greatest mineral surface area (per unit of aggregate). Open-graded aggregate largely consist of a single, large-sized (e.g., around 0.375 to 1.0 inch) stone with very low levels (typically less than about two percent of the total aggregate) of fines (material less than 0.25 inch) or filler (mineral material less than 0.075 mm). Gap graded aggregate fall between dense-graded and open-graded classes. Reclaimed asphalt pavement (RAP) material generally reflects the gradation of the pavement from which the reclaimed material was obtained. If the original pavement was a dense-graded mix, the RAP will also be dense graded, although the filler content is generally observed to be lower than the design limits of the origin aggregate specifications. The aggregate can be applied in an amount of from 100 to 2000 parts by weight.

Compositions that include aggregate can also include air voids in some embodiments. The air voids can be present in an amount of from 2% to 30% by volume (e.g., greater than 2% to 10% by volume).

The composition can be prepared by mixing the asphalt, any aromatic recycling agents or non-asphaltic rosin materials, electrically neutral copolymer (for example, in the form of a latex dispersion), emulsifier, acid or base, water and any additives. The particular components can be mixed together by means known in the art. In some embodiments, the electrically neutral copolymer is pre-mixed with an anionic emulsifier or a cationic emulsifier to produce a charged copolymer prior to mixing the asphalt and the acid or base with the emulsifier and the electrically neutral copolymer. If aggregate is blended into the composition, it can be added, for example, after the other components are blended. In some embodiments, the composition is prepared at an elevated temperature, for example, from 50° C. to 140° C., from 55° C. to 120° C., or from 60° C. to 80° C. In some embodiments, the composition can be prepared at ambient temperature.

The composition can be applied for use in a pavement or paved surface. A pavement surface or a paved surface is a hard surface that can bear pedestrian or vehicular travel can include surfaces such as motorways/roads, parking lots, bridges/overpasses, runways, driveways, vehicular paths, running paths, walkways, and the like. The composition can be applied directly to an existing paved surface or can be applied to an unpaved surface. In some embodiments, the composition is applied to an existing paved layer as a tie layer, and a new layer comprising asphalt such as a hot mix layer is applied to the tie layer. The asphalt composition can be applied to a surface "cold", i.e., at a temperature below 40° C., or can be applied to at an elevated temperature, for example, from 50° C. to 120° C., from 55° C. to 100° C., or from 60° C. to 80° C.

In some embodiments, aggregate is blended into the composition prior to application to a surface. In some embodiments, aggregate is applied to the composition after it is applied to a surface. In some embodiments, sand can be applied to the composition after it is applied to a surface, for example, if the composition is to be used as a tack coat, to reduce the tackiness of the surface. The composition and optionally the aggregate can be compacted after application to the surface as would be understood by those of skill in the art.

In some embodiments, the composition is used as a tack coat or coating. The tack coat is a very light spray application of diluted asphalt emulsion that is used to promote a bond between an existing surface and the new asphalt application. The tack coat acts to provide a degree of adhesion or bonding between asphalt layers, and in some instances, may fuse the layers together. The tack coat also acts to reduce slippage and sliding of the layers relative to other layers in the pavement structure during use or due to wear and weathering of the pavement structure. As described above, the composition can be applied to an existing paved layer (such as a hot mix layer) as a tie layer as a tack coat, and a new layer comprising asphalt such as a hot mix layer can be applied to the tack coat. As would be understood by those skilled in the art, the tack coat typically does not include aggregate, although sand may be applied to the tack coat after application as mentioned above. The composition described herein has unexpectedly been found to be a low-tracking or "trackless" coating such that, after the tack coating is cured, paving vehicles or other traffic may be permitted to pass over the coating such that the vehicle tires or treads stick to the coating a limited amount (low track) or not at all (trackless). The composition described herein has unexpectedly been found to be low-tracking or "trackless," for example, at higher pavement temperatures (50° C.-60° C.) and/or with low or medium pen asphalts having a pen value of greater than 40 dmm. The tack coat is tacky and capable of bonding together layers of a pavement structure at ambient conditions for pavement construction or at elevated temperatures, e.g., up to 140° C. as discussed above. In fact, the tack coat provides a sufficiently flexible asphalt at low temperatures with sufficient bond strength to bond adjacent asphalt layers. The tack coat cures quickly such that the pavement layer may be applied to the coating, hours to days after the emulsion is applied to the substrate. The applied composition can cure in 15 minutes to 45 minutes, and may cure as rapidly as 5 to 15 minutes after the composition is applied to the exposed surface. The cure rate will depend on the application rate, the dilution ratios used, the base course conditions, the weather, and other similar considerations. If the prepared pavement surface or base course contains excess moisture, the curing time of the emulsion may be increased.

In some embodiments, the composition can also be used as a fog seal. A fog seal is a surface treatment that applies a light application of the composition to an existing paved surface such as a parking lot to provide an enriched pavement surface that looks fresh and black. In some embodiments, the fog seal would include a filler such as carbon black to blacken the composition. As would be understood by those skilled in the art, the fog seal typically does not include aggregate. The fog seal compositions, like the bond coat compositions, have also been shown to be to be low-tracking or "trackless" coatings.

In some embodiments for the tack coat and fog seal, the asphalt can be present in an amount of from 58 to 62 parts by weight, the copolymer can be present in an amount of from 2 to 6 parts by weight, the emulsifier can be present in an amount of from 0.75 to 3 parts by weight, the acid or base can be present in an amount of from 0.75 to 3 parts by weight, any optional additives be provided in an amount of up to 5 parts by weight, and water can be present in an amount of from 30 to 40 parts by weight. In some embodiments, the composition can be further diluted with water. The penetration of these compositions is generally about 60-150 dmm on an existing pavement surface. The composition can be applied at a rate of 0.05-0.10 gallons/yd$^2$.

In some embodiments, the composition can be used as a chip seal composition. Chip seals are the most common surface treatment for low-volume roads. The chip seal composition would be applied to a surface followed by the application of aggregate. In some embodiments for the chip seal, the asphalt can be present in an amount of from 64 to 67 parts by weight, the copolymer can be present in an amount of from 1.5 to 3.5 parts by weight, the emulsifier can be present in an amount of from 0.15 to 0.35 parts by weight, the acid or base can be present in an amount of from 0.15 to 0.35 parts by weight, any optional additives be provided in an amount of up to 5 parts by weight, and water can be present in an amount of from 30 to 40 parts by weight. The aggregate can be provided in an amount of from 200 to 1000 parts by weight.

In some embodiments, the composition can be used as a microsurfacing application. Microsurfacing is designed for quick traffic return with the capacity of handling high traffic volume roadways. For the microsurfacing composition, aggregate is typically mixed in with the asphalt, copolymer, emulsifier and acid or base prior to application to a surface. In some embodiments for the microsurfacing, the asphalt can be present in an amount of from 60 to 62 parts by weight, the copolymer can be present in an amount of from 3 to 4.5 parts by weight, the emulsifier can be present in an amount of from 0.5 to 2.5 parts by weight, the acid or base can be present in an amount of from 0.5 to 2.5 parts by weight, any optional additives be provided in an amount of up to 5 parts by weight (e.g., 0.25 to 2 parts by weight of one or more inorganic salts or up to 5 parts by weight of a mineral filler), and water can be present in an amount of from 30 to 40 parts by weight. The aggregate can be provided in an amount of from 500 to 2000 parts by weight.

The resulting paved surface layer using the composition, once dried, includes the components provided in the composition with the exception of water. Thus, the paved surface layer can include asphalt in an amount of from 40 to 70 parts by weight, an electrically neutral copolymer in an amount of from greater than 0 to 10 parts by weight, an emulsifier in an amount of from 0.1 to 4 parts by weight, and an acid or base in an amount of from 0.1 to 4 parts by weight. In the case of a tack coat, the paved surface can include a first layer comprising asphalt; a tie layer provided on the first layer, comprising asphalt in an amount of from 40 to 70 parts by weight, an electrically neutral copolymer in an amount of from greater than 0 to 10 parts by weight, an emulsifier in an amount of from 0.1 to 4 parts by weight, and an acid or base in an amount of from 0.1 to 4 parts by weight; and a second layer comprising asphalt provided on the tie layer.

Although parts by weight are used for the compositions described herein, percentages by weight could be used interchangeability with the parts by weight, for example, where the composition includes the asphalt, the electrically neutral copolymer, the emulsifier, the acid or base, the water, and any additives excluding aggregate. For example, the composition can be described to include (a) asphalt in an amount of from 40 to 70 percent by weight; (b) an electrically neutral copolymer in an amount of from greater than 0 to 10 percent by weight; (c) an emulsifier in an amount of from 0.1 to 4 percent by weight; (d) an acid or a base in an amount of from 0.1 to 4 percent by weight; and (e) water in an amount of from 25 to 60 percent by weight.

The following non-limiting examples are provided to more fully illustrate some particular embodiments. Parts and percentages are provided on a per weight basis except as otherwise indicated.

Procedures

Tracking Test Procedure for Asphalt

1. Equipment & Materials
   1.1. Drawdown bar, 0.015"
   1.2. Tracking wheel (10 lb weight—slots for o-rings)
   1.3. 4 inch square cut o-rings (4" lathe cut Buna gasket)
   1.4. Track wheel that holds o-rings
   1.5. 30 lb felt cut into 12×12" sheet
   1.6. Contact cement (3M Super 77 multi-purpose adhesive)
   1.7. White uncoated poster board cut into 12×14 sheet
   1.8. Particle board (cut 12×12"—similar to roofing felt)
2. Procedure 2.1. Felt should be cemented to particle board prior to starting test 2.2. Label felt 2.3. Put enough emulsion on felt, about 40 ml and drawdown with drawdown bar 2.4. Start a timer and put sample at specified temperature 2.5. Place two new o-rings on track wheel in slots. NOTE: Dots on o-rings should not come into contact with the test area so place them so it will not happen. Also new o-rings are used for each sample tested.

2.6. About 15 seconds before 10 minutes is up, take sample and place it sideways, opposite way of the drawdown 2.7. Run the track wheel, with the o-rings attached, over the white paper placed on particle board to be at same level as sample. Write the time next to track line. Try to keep the track wheel running in a straight line. NOTE: When doing this start a little over from the middle because this process will be repeated several times.

2.8. Return sample to specified testing temperature 2.9. Repeat steps 2.5-2.8 at 20 minutes and 30 minutes. All three times will be tested on same sample

EXAMPLES

Asphalt compositions were prepared using different asphalt grades. An electrically neutral styrene-acrylic copolymer latex with a Tg of +10° C. was provided in Examples 1 and 2 but not Comparative Examples 1 and 2. The examples were tested using ASTM D7497 to obtain the residue used in Table 1 below.

TABLE 1

|  |  |  | Comp. 1 | Ex. 1 | Comp. 2 | Ex. 2 |
|---|---|---|---|---|---|---|
| Base Asphalt Grade |  |  | NuStar PG58-28 | NuStar PG58-28 | NuStar PG64-22 | NuStar PG64-22 |
| % Copolymer |  |  | 0 | 5 | 0 | 5 |
| % Emulsifier (CRS Type) |  |  | 0.35 | 0.35 | 0.35 | 0.35 |
| Tests on unaged material: | ° C. | Spec. Limit |  |  |  |  |
| Phase Angle (delta) | 58 |  |  | 80.0 |  | 76.8 |
| G*/sin delta@ 10 rad/sec, kPa | 58 | 1.0 min. |  | 3.15 |  | 7.98 |
| Phase Angle (delta) | 64 |  |  | 82.4 |  | 79.4 |
| G*/sin delta@ 10 rad/sec, kPa | 64 | 1.0 min. |  | 1.69 |  | 3.77 |
| Phase Angle (delta) | 70 |  |  | 84.5 | 68.3 | 81.9 |
| G*/sin delta@ 10 rad/sec, kPa | 70 | 1.0 min. |  | 0.88 | 1.33 | 1.88 |
| Phase Angle (delta) | 76 |  |  | 65.6 | 84.1 | 70.1 |
| G*/sin delta@ 10 rad/sec, kPa | 76 | 1.0 min. |  | 0.82 | 1.00 | 1.45 |
| Phase Angle (delta) | 82 |  |  |  |  | 68.5 |
| G*/sin delta@ 10 rad/sec, kPa | 82 | 1.0 min. |  |  |  | 0.88 |

The residue for Comparative Example 1 and Example 1 after curing at 50° C. for periods of 10 minutes, 20 minutes and 30 minutes were tested using the tracing test procedure discussed herein. The results of the tracing test procedure showed that the composition of Example 1 that includes the electrically neutral copolymer was trackless while Comparative Example 1 had significant tracking.

Example 3 was prepared using the same composition as Example 1 but with a different PG58-28 base asphalt using the residue resulting from the procedure of ASTM D7497. Example 4 was prepared in the same manner as Example 3 and tested by applying a thin film of the composition at a thickness of 15 microns and curing it for 6 hours at 60° C. The residue measurements are provided in Table 2 below.

TABLE 2

| Sample Id. |  |  | Ex. 3 | Ex. 4 |
|---|---|---|---|---|
| Phase Angle (delta) | 64 |  | 72.2 | 72.4 |
| G*/sin delta @ 10 rad/sec, kPa | 64 | 1.0 min. | 7.36 | 8.59 |
| Phase Angle (delta) | 70 |  | 75.0 | 75.0 |
| G*/sin delta @ 10 rad/sec, kPa | 70 | 1.0 min. | 3.69 | 4.38 |
| Phase Angle (delta) | 76 |  | 77.5 | 77.5 |
| G*/sin delta @ 10 rad/sec, kPa | 76 | 1.0 min. | 1.93 | 2.25 |
| Phase Angle (delta) | 82 |  | 79.6 | 79.6 |
| G*/sin delta @ 10 rad/sec, kPa | 82 | 1.0 min. | 1.05 | 1.20 |
| Phase Angle (delta) | 88 |  | 81.0 | 81.3 |
| G*/sin delta @ 10 rad/sec, kPa | 88 | 1.0 min. | 0.60 | 0.67 |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative composition materials and method steps disclosed herein are specifically described, other combinations of the composition materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

The invention claimed is:

1. A paved surface, comprising:
   (a) a first layer comprising asphalt;
   (b) a tie layer provided on the first layer, comprising asphalt in an amount of from 82.9% to 94.7% by weight, an electrically neutral copolymer in an amount of from 2.9% to 9.2% by weight, an emulsifier in an amount of from 1.0% to 4.7% by weight, and an acid or base in an amount of from 1.0% to 4.7% by weight; and
   (c) a second layer comprising asphalt provided on the tie layer.

2. The paved surface as claimed in claim 1, wherein the electrically neutral copolymer includes a styrene acrylic copolymer or a pure acrylic copolymer derived from monomers including one or more (meth)acrylates and optionally styrene.

3. The paved surface as claimed in claim 1, wherein the emulsifier includes a cationic emulsifier and the acid or base comprises an acid.

4. The paved surface as claimed in claim 1, wherein the emulsifier includes an anionic emulsifier and the acid or base comprises a base.

5. The paved surface as claimed in claim 1, wherein the tie layer further comprises up to 12.2% by weight of one or more aromatic recycling agents or non-asphaltic rosin materials.

6. The paved surface as claimed in claim 1, wherein the asphalt in the tie layer has a pen value of greater than 40 dmm.

7. The paved surface as claimed in claim 1, wherein the tie layer further comprises aggregate.

8. A method of producing a paved surface, comprising:
   producing an aqueous composition comprising water and a tie layer composition, the tie layer composition comprising:
   (a) asphalt in an amount of from 82.9% to 94.7% by weight,
   (b) an electrically neutral copolymer in an amount of from 2.9% to 9.2% by weight,
   (c) an emulsifier in an amount of from 1.0% to 4.7% by weight, and
   (d) an acid or base in an amount of from 1.0% to 4.7% by weight;
   applying the aqueous composition to an existing paved layer as a tie layer; and
   applying a new layer comprising asphalt to the tie layer.

9. The method as claimed in claim 8, wherein the electrically neutral copolymer is pre-mixed with an anionic emulsifier or a cationic emulsifier to produce a charged latex copolymer prior to mixing the asphalt and the acid or base with the emulsifier and the electrically neutral copolymer.

10. The method as claimed in claim 8, wherein aggregate is blended with the aqueous composition prior to applying the aqueous composition to the existing paved layer.

11. The method as claimed in claim 8, wherein the electrically neutral copolymer includes a styrene acrylic copolymer or a pure acrylic copolymer derived from monomers including one or more (meth)acrylates and optionally styrene.

12. The method as claimed in claim 8, wherein the emulsifier includes a cationic emulsifier and the acid or base comprises an acid.

13. The method as claimed in claim 8, wherein the emulsifier includes an anionic emulsifier and the acid or base comprises a base.

14. The method as claimed in claim 8, wherein the aqueous composition further comprises up to 12.2% by weight of one or more aromatic recycling agents or non-asphaltic rosin materials.

15. The method as claimed in claim 8, wherein the asphalt in the aqueous composition has a pen value of greater than 40 dmm.

* * * * *